US010909338B2

(12) United States Patent
Mak et al.

(10) Patent No.: US 10,909,338 B2
(45) Date of Patent: Feb. 2, 2021

(54) RADIO FREQUENCY COMMUNICATION GUIDING DEVICE

(71) Applicant: Hong Kong R&D Centre for Logistics and Supply Chain Management Enabling Technologies Limited, Pok Fu Lam (HK)

(72) Inventors: Chi Lun Mak, Pok Fu Lam (HK); Jing Tian Xi, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 0 days.

(21) Appl. No.: 16/493,827

(22) PCT Filed: Mar. 15, 2017

(86) PCT No.: PCT/CN2017/076759
§ 371 (c)(1),
(2) Date: Sep. 13, 2019

(87) PCT Pub. No.: WO2018/165899
PCT Pub. Date: Sep. 20, 2018

(65) Prior Publication Data
US 2020/0082136 A1    Mar. 12, 2020

(51) Int. Cl.
*G06K 7/08*  (2006.01)
*G06K 7/10*  (2006.01)
*G08B 6/00*  (2006.01)
*H01Q 1/22*  (2006.01)
*H01Q 9/04*  (2006.01)
*H01Q 23/00* (2006.01)

(52) U.S. Cl.
CPC .......... *G06K 7/10366* (2013.01); *G08B 6/00* (2013.01); *H01Q 1/2225* (2013.01); *H01Q 9/0407* (2013.01); *H01Q 23/00* (2013.01)

(58) Field of Classification Search
CPC ......... G06K 7/00; G06K 7/08; G06K 17/0025
USPC ................... 235/451, 492, 462.46, 472.02
See application file for complete search history.

(56) References Cited

U.S. PATENT DOCUMENTS

| 9,842,814 | B1* | 12/2017 | Herrault | H01L 23/66 |
| 2002/0053735 | A1* | 5/2002 | Neuhaus | H01L 24/95 |
| | | | | 257/728 |
| 2003/0173108 | A1 | 9/2003 | Takano | |
| 2006/0105496 | A1* | 5/2006 | Chen | H01L 24/05 |
| | | | | 438/106 |
| 2008/0179404 | A1* | 7/2008 | Finn | H01Q 1/2225 |
| | | | | 235/492 |
| 2009/0200650 | A1* | 8/2009 | Tan | G06K 19/072 |
| | | | | 257/679 |

FOREIGN PATENT DOCUMENTS

| CN | 203244562 | 10/2013 |
| KR | 100847288 | 7/2008 |

* cited by examiner

*Primary Examiner* — Daniel St Cyr
(74) *Attorney, Agent, or Firm* — Renner, Kenner, Greive, Bobak, Taylor & Weber (57) ABSTRACT

A radio frequency communication guiding device comprising: a generally elongated body having an elongated cavity therein arranged to house a communication circuit, wherein the communication circuit is supported within the cavity by a substrate layer arranged to place within the cavity so as to support the communication circuit within the cavity.

20 Claims, 7 Drawing Sheets

RADIO FREQUENCY COMMUNICATION GUIDING DEVICE

TECHNICAL FIELD

The present invention relates generally to a radio frequency communication guiding device and more particularly, although not exclusively, relates to a radio frequency communication guiding device having an elongated cavity therein arranged to house a communication circuit, wherein the communication circuit is supported within the cavity by a substrate layer arranged to place within the cavity so as to support the communication circuit within the cavity.

BACKGROUND

Visual impairment is a decreased ability to see to a degree that causes problem not fixable by usual means, such as glasses. According to the latest statistics, 285 million people are estimated to be visually impaired worldwide, with 39 million being blind and 246 having low vision. Although visual impairment may be prevented or cured to a certain degree, a major population of the people living with blindness are aged 50 and above. To correct visual impairment once it occurs is way more challenging than to prevent the occurrence of visual impairment.

In some cases, one or more parts of the eye or brain that are needed to process images become diseased or damaged, severe or total loss of vision can occur. In the worst scenario, vision can't be fully restored with medical treatment, surgery, or corrective lenses. While some patients are completely blind, some other patients haven't lost their sight completely but have lost enough vision that they would have to stand extremely closer to an object than someone with perfect vision. Not only have the daily lives of those visually impaired been affected, but also the lives of the people who care for them.

Apart from the above issue, navigating in an unfamiliar area or premises is sometime frustrating, especially if someone is in hurry to get to a specific place in that area e.g. the correct gate at a large airport, etc. Moreover, real time information is crucial for an effective navigation, for example, an elevator is suspended, a path is blocked by an ad hoc event or accident, a water closet is out of order until further notice, etc.

SUMMARY OF THE INVENTION

To solve or reduce at least some of the above problems, the present invention discloses a radio frequency communication guiding device comprising: a generally elongated body having an elongated cavity, a communication circuit for communicating with an external reader unit connected to a smart device for accessing the database at the back end, and a substrate layer for supporting the communication circuit.

In accordance with a first aspect of the present invention, there is provided a radio frequency communication guiding device comprising: a generally elongated body having an elongated cavity therein arranged to house a communication circuit, wherein the communication circuit is supported within the cavity by a substrate layer arranged to place within the cavity so as to support the communication circuit within the cavity.

In one embodiment of the first aspect, the substrate layer supports the communication circuit such that the communication circuit is separated from the base of the cavity.

In one embodiment of the first aspect, the communication circuit includes a radio frequency communication chip arranged to be connected to an antenna for communicating with an external device.

In one embodiment of the first aspect, the radio frequency communication chip is connected to the antenna via an inlay.

In one embodiment of the first aspect, the substrate layer includes a chip cavity arranged for a radio frequency communication chip to be sandwiched within the substrate layer.

In one embodiment of the first aspect, the antenna is planar and is placed in a planar position parallel to the substrate layer.

In one embodiment of the first aspect, the substrate layer is made of a non-conductive material.

In one embodiment of the first aspect, the substrate layer is made from foam, dielectric material or any combination thereof.

In one embodiment of the first aspect, the substrate layer is porous or includes numerous perforated apertures.

In one embodiment of the first aspect, any porous areas or perforated apertures of the substrate layer is covered by a layer of film.

In one embodiment of the first aspect, the elongated cavity is longer than the substrate layer.

In one embodiment of the first aspect, the elongated cavity and the substrate layer provides an elongated space for tuning of the communication circuit.

In one embodiment of the first aspect, the cavity is covered with a tactile cover after the communication circuit is placed within the cavity.

In one embodiment of the first aspect, the substrate layer may include an anchor hole arranged to receive an anchoring fastener to engage the device to a surface.

In one embodiment of the first aspect, the guiding device is arranged to provide a tactile guide to visually impaired users.

In one embodiment of the first aspect, the communication circuit is a radio frequency identification (RFID) circuit.

In one embodiment of the first aspect, the RFID circuit is a passive RFID circuit arranged to communicate with an external reader unit.

In one embodiment of the first aspect, the external reader unit is a visually impaired assistance tool.

In one embodiment of the first aspect, the elongated body is made with metal.

In one embodiment of the first aspect, the elongated body is made with plastic.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

With reference to FIGS. 1 to 4B, there is provided a radio frequency communication guiding device 10 comprising: a generally elongated body 100 having an elongated cavity 120 therein arranged to house a communication circuit 200, wherein the communication circuit 200 is supported within the cavity 120 by a substrate layer 300 arranged to place within the cavity 120 so as to support the communication circuit 200 within the cavity 120.

With reference to FIGS. 1A to 2B, the radio frequency communication guiding device 10 is provided a body 100, preferably made with metal or plastic, or a combination of metal and plastic. The body 100 is generally elongated, for example, having a thickness in mm-level. The elongated body 100 is at least partially hollowed to provide an elongated cavity 120 for receiving a communication circuit 200, e.g. a radio frequency identification (RFID) circuit 200 and a substrate layer 300 for supporting the communication circuit 200, such that the communication circuit 200 is separated from the base of the elongated cavity 120.

Advantageously, the elongated cavity 120 is longer than the substrate layer 300, thereby providing the elongated cavity 120 and the substrate layer 300 an elongated space 140 for tuning of the communication circuit 200 during installation or anytime if necessary. Upon placing the communication circuit 200 within the elongated cavity 120 and at the designated position, the elongated cavity 120 is then covered with a tactile cover 400, preferably made with plastic, which offers some physical protection to the inner structure of the radio frequency communication guiding device 10.

Preferably, the tactile cover 400 may absorb at least some of the external force, thereby protecting the communication circuit 200 from suffering severe physical damages. Optionally, the free space within the elongated cavity 120 may also be filled by the tactile cover 400, such that the communication circuit 200 may be securely positioned and isolated from the edges of elongated cavity 120 as well as the elongated body 100 in the longitudinal direction.

Figure 3A:
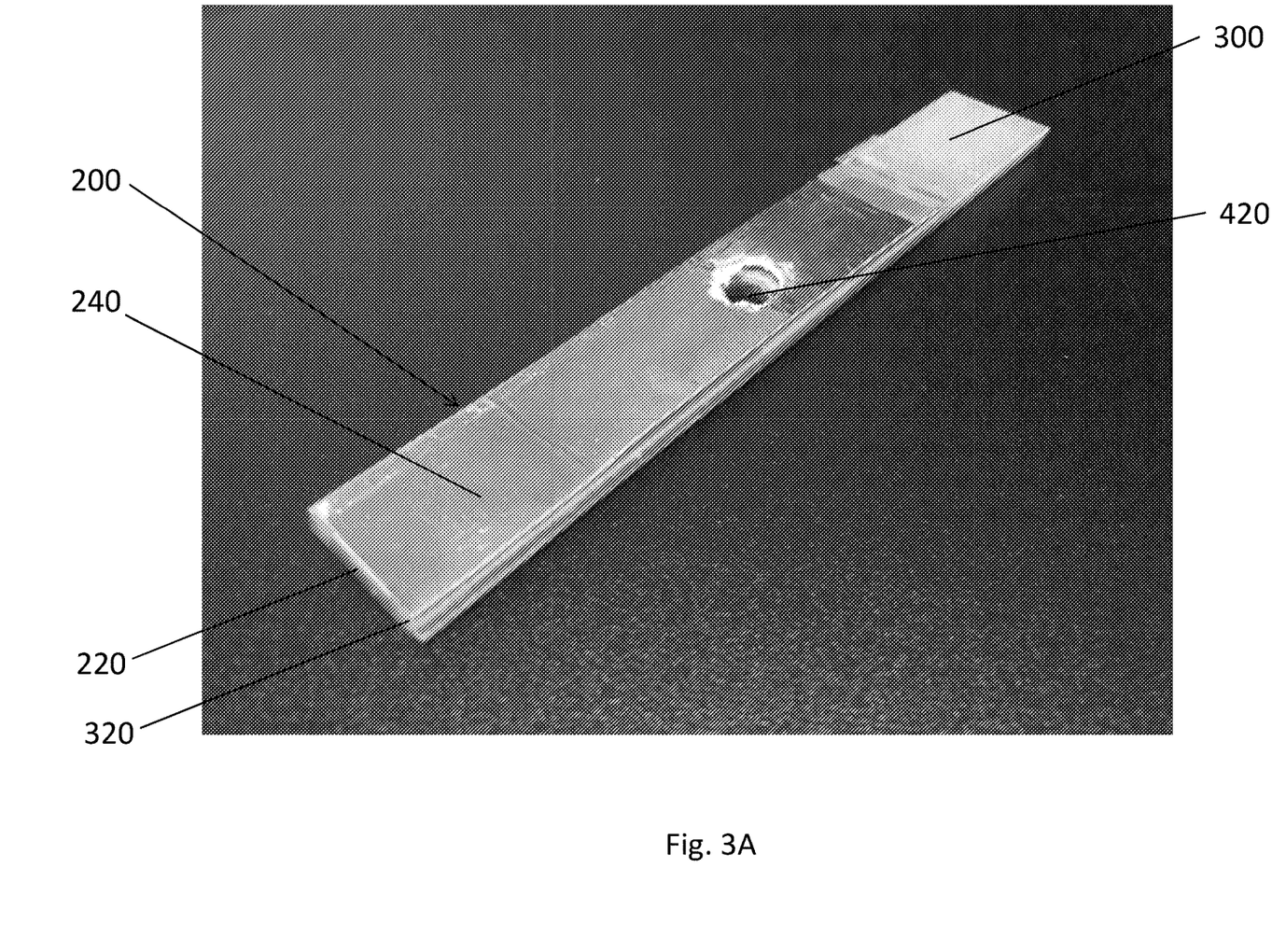
FIG. 3A shows a perspective view of a partial radio frequency communication guiding device with substrate layer and antenna in accordance with one embodiment of the present invention.
Figure 3B:
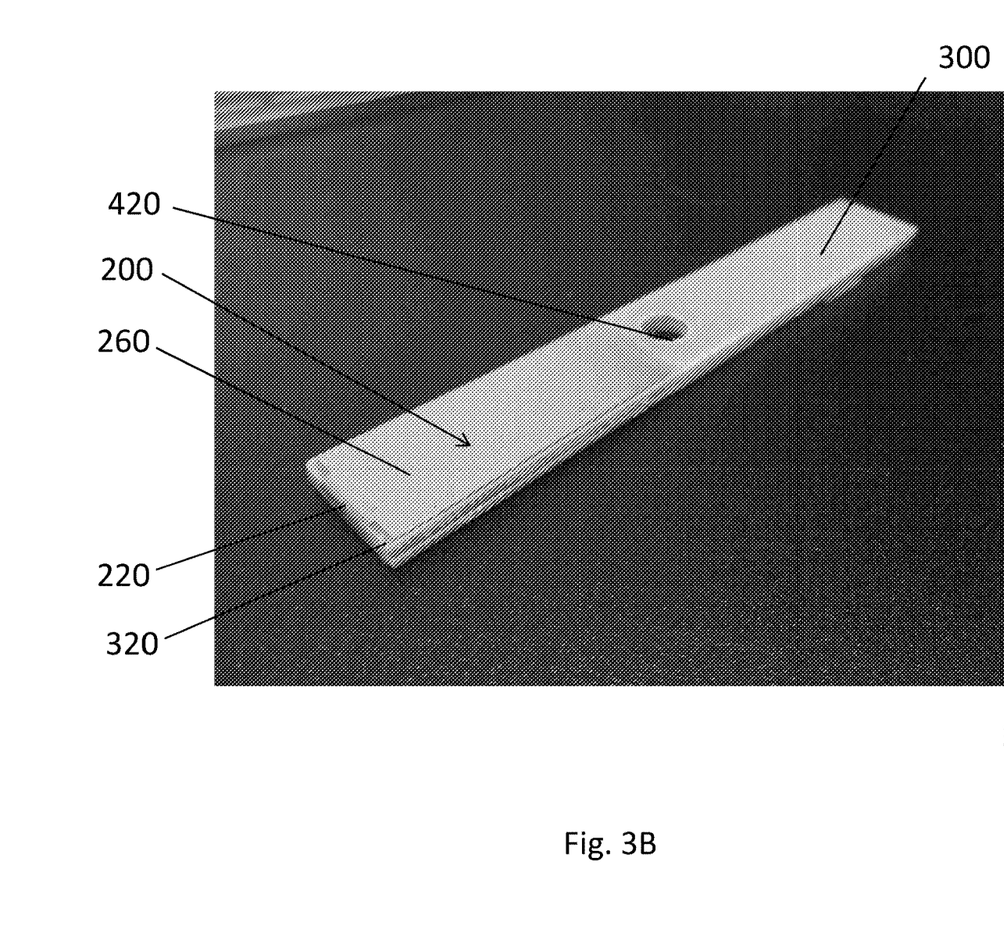
FIG. 3B shows a perspective view of a partial radio frequency communication guiding device of FIG. 3A with substrate layer and inlay in accordance with one embodiment of the present invention.
Figure 3C:
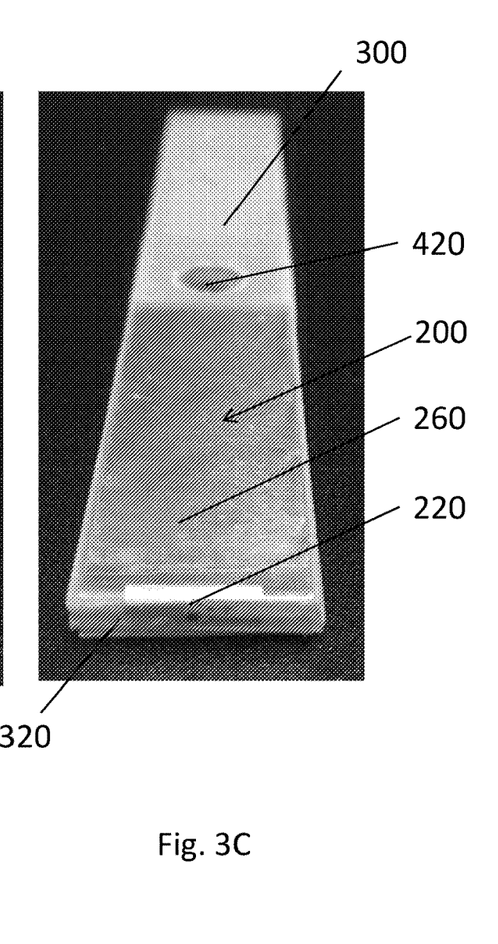
FIG. 3C is a front view of FIG. 3B in accordance with one embodiment of the present invention.

With reference to FIGS. 3A to 3C, the communication circuit 200 is provided a radio frequency communication chip 220, an antenna 240 e.g. a metal foil 240 connected with the radio frequency communication chip 220 for communicating with an external device (not shown). Preferably, the radio frequency communication chip 220 is connected to the antenna 240 via an inlay 260. In one example, the radio frequency communication chip 220 may be located at one side of the substrate layer 300 instead of the top surface thereof, such that the radio frequency communication chip 220 would be safeguarded from any external pressure exerting from the top surface of the radio frequency communication guiding device 10.

Without wishing to be bound by theory, the inventors, through their own research via trials and experimentations, have discovered that the arrangement of the antenna 240 is essential for providing desirable radiation performance, in terms of its radiation pattern and read range.

Preferably, the operating frequency of the communication circuit 200 may be manipulated by controlling the length of the metal foil 240 or adjusting the position of the radio frequency communication chip 220 with respect to the elongated cavity 120. In one embodiment, an antenna 240 of around 10 cm may give an operating frequency of around 915 MHz. Advantageously, the desirable location of the antenna 240 and the suitable length of the antenna 240 in this arrangement may provide an improved operating performance at the ultra-high frequency (UHF) band. In any event, the antenna 240 may not be in contact with the elongated body 100.

The inventors, through their own research via trials and experimentations, have also discovered that the performance of the antenna 240 may be affected significantly by the material of the floor underneath the antenna 240, as well as the material underneath the floor.

In one embodiment, the radio frequency communication chip 220 is disposed within the substrate layer 300. For instance, the substrate layer 300 may be slightly bent and versatile, such that the radio frequency communication guiding device 10 may be rested at any location, e.g. within the boundary of two layers with different materials. Advantageously, the bending force is only introduced to the substrate layer 300 locally without transmitted further to the communication circuit 200, such that the radio frequency communication guiding device 10 would be more durable when it is inevitably applied to uneven surfaces.

Preferably, the substrate layer 300 may include a chip cavity 320 for accommodating the radio frequency communication chip 220, such that the radio frequency communication chip 220 may be sandwiched within the substrate layer 300, or embedded to the substrate layer 300 in other alternative arrangements. Preferably, the antenna 240 may be planar and being disposed in a planar position parallel to the substrate layer 300, such that the antenna 240 is supported by the substrate layer 300. Optionally, the substrate layer 300 may be made of a non-conductive material or alternatively made from foam (e.g. filled with air), dielectric material e.g. FR4 PCB or any combination thereof.

Figure 3D:
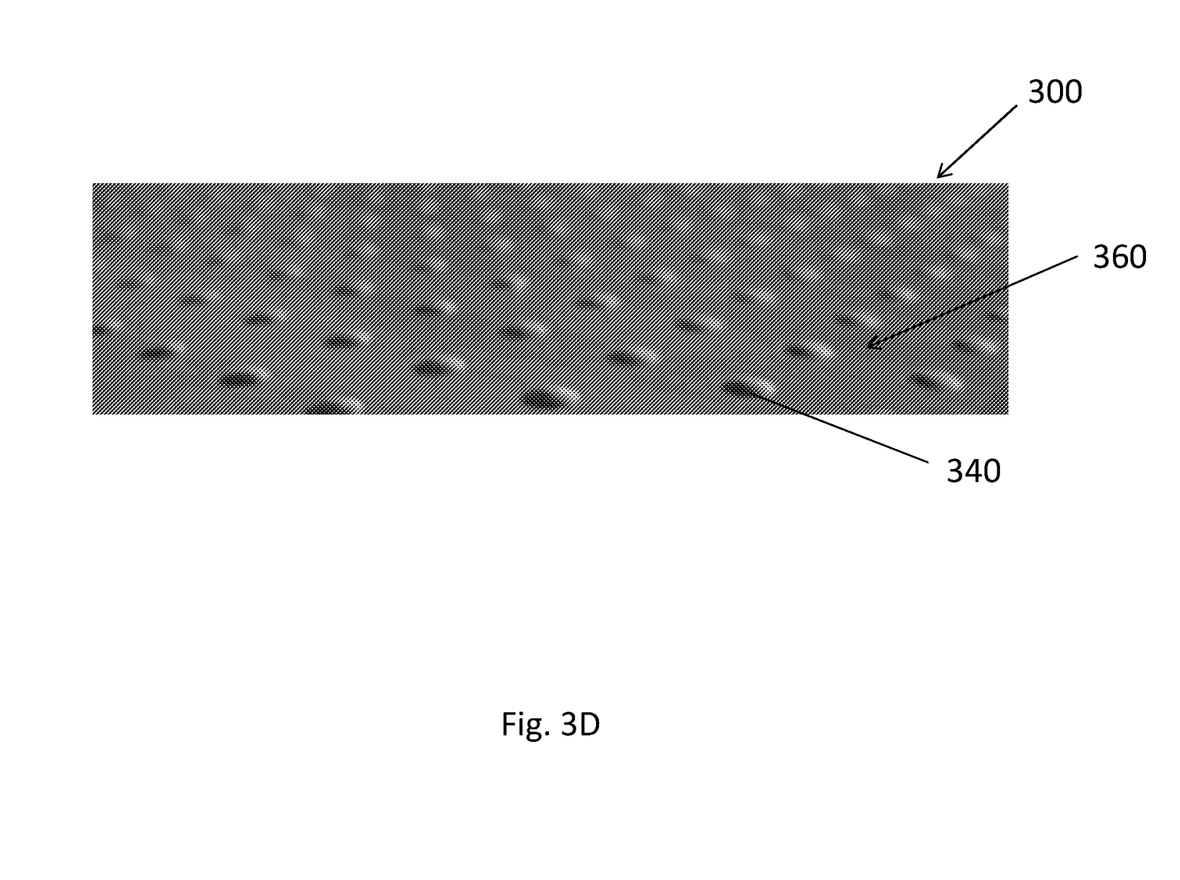
FIG. 3D shows a substrate layer with perforated apertures in accordance with one embodiment of the present invention.

In one alternative embodiment, the substrate layer 300 may be a combination of dielectric material and air. For instance, the substrate layer 300 may be provided in porous form or includes numerous perforated apertures 340, as shown in FIG. 3D. To avoid any filling therein, the porous areas or perforated apertures 340 of the substrate layer 300 may be covered by a layer of film 360.

Figure 1A:
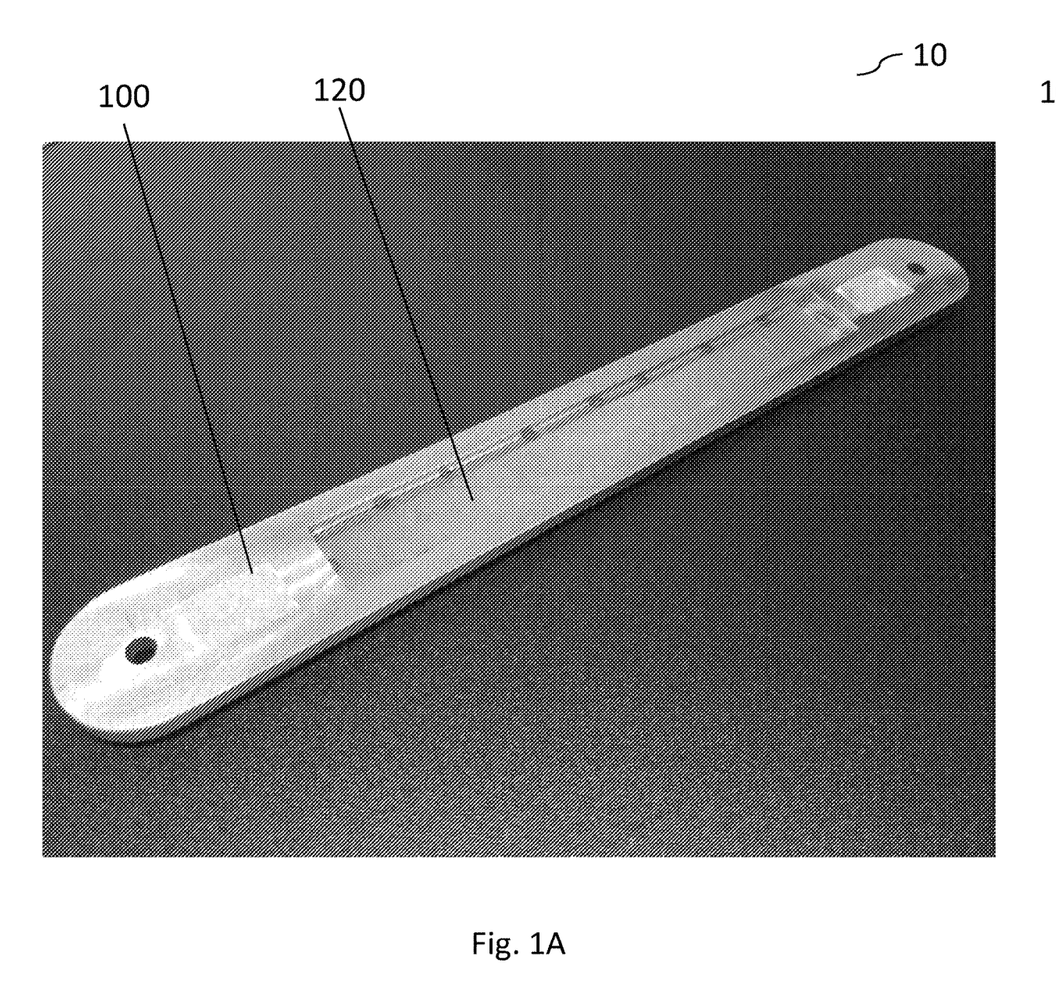
FIG. 1A shows a perspective view of a metallic body of a radio frequency communication guiding device in accordance with one embodiment of the present invention.
Figure 1B:
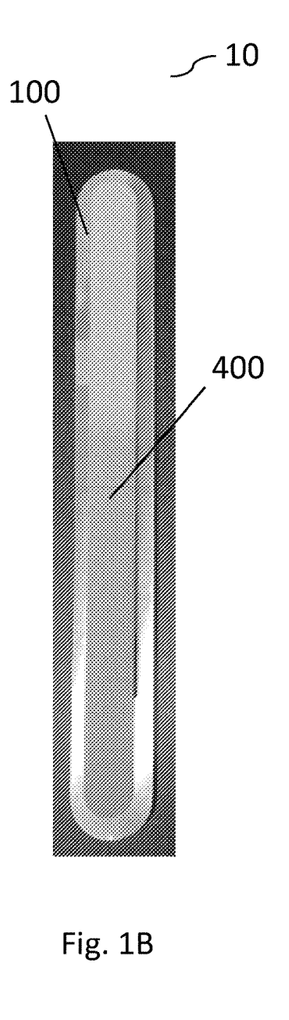
FIG. 1B is a top view of the metallic body of FIG. 1A with plastic cover in accordance with one embodiment of the present invention.
Figure 2A:
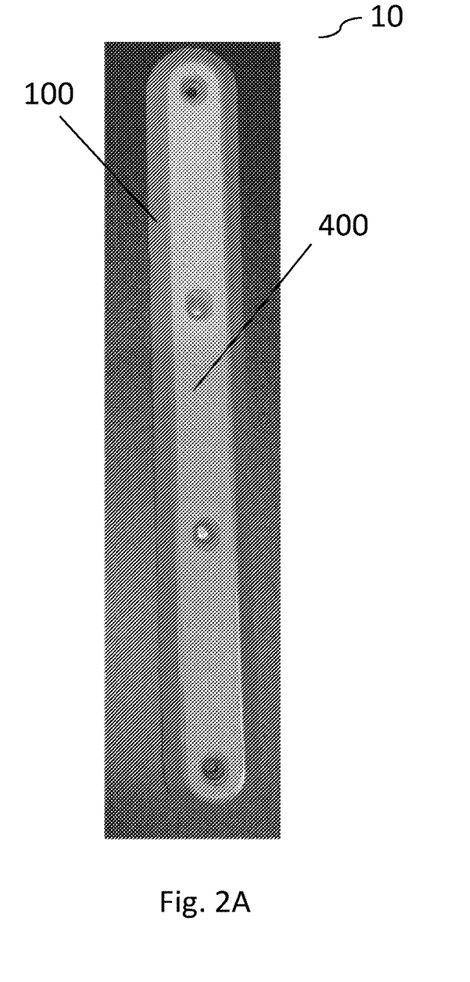
FIG. 2A shows a top view of a plastic body of a radio frequency communication guiding device in accordance with another embodiment of the present invention.
Figure 2B:
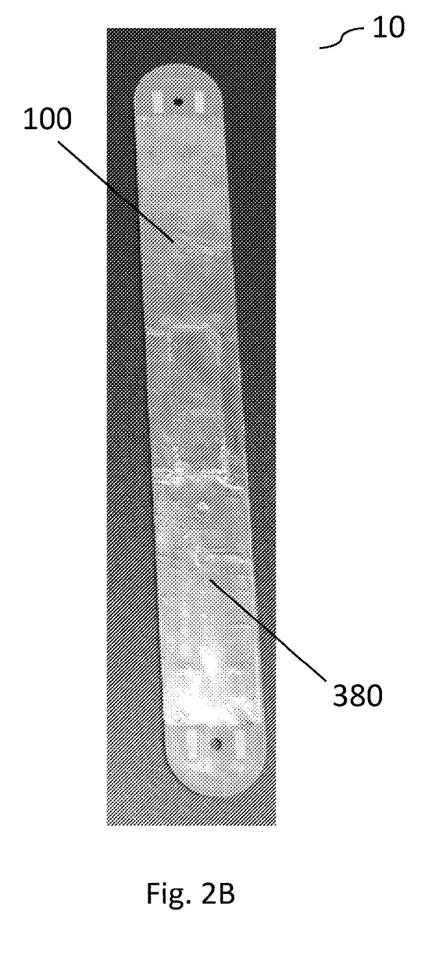
FIG. 2B is a bottom view of FIG. 2A in accordance with another embodiment of the present invention.
Figure 4A:
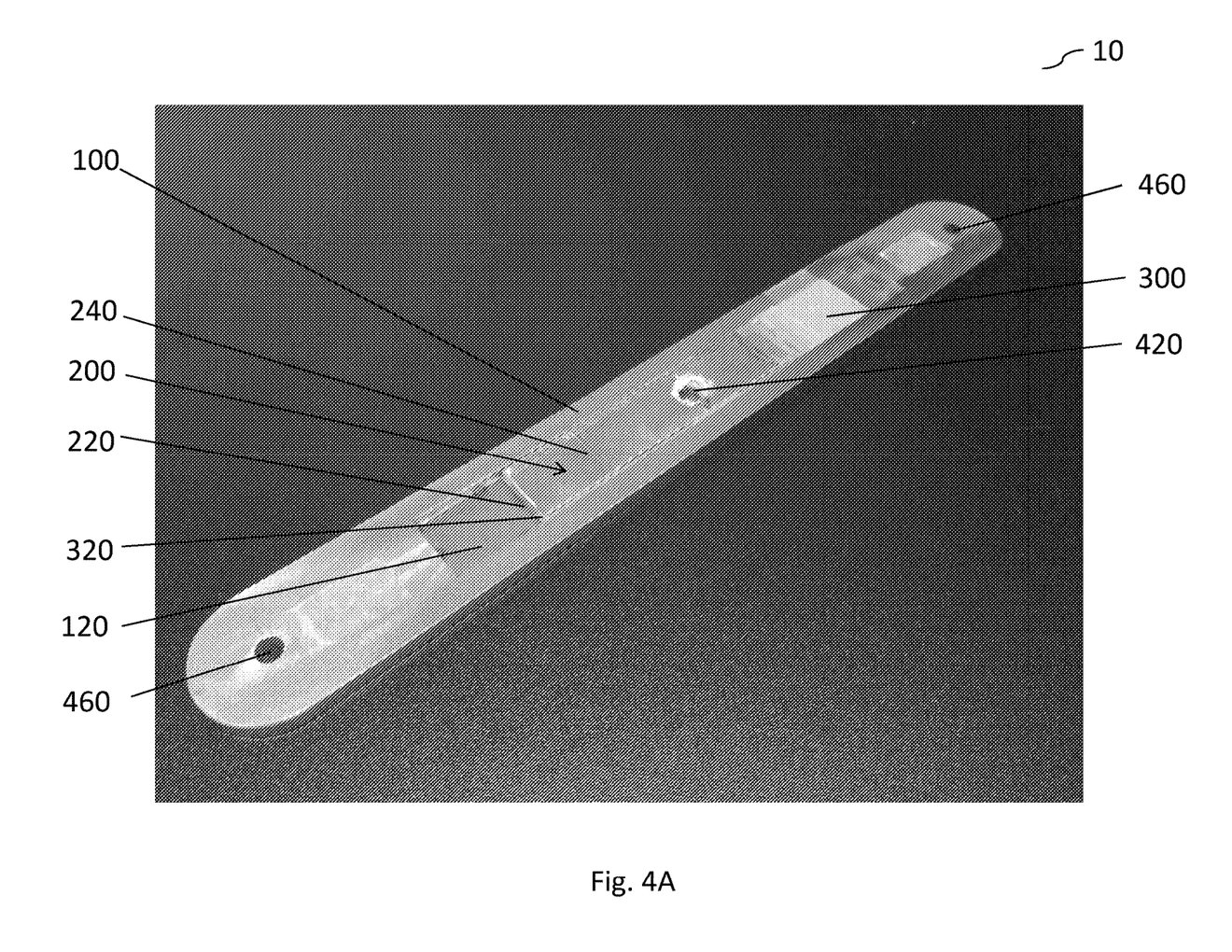
FIG. 4A shows a perspective view of a radio frequency communication guiding device in accordance with yet another embodiment of the present invention.
Figure 4B:
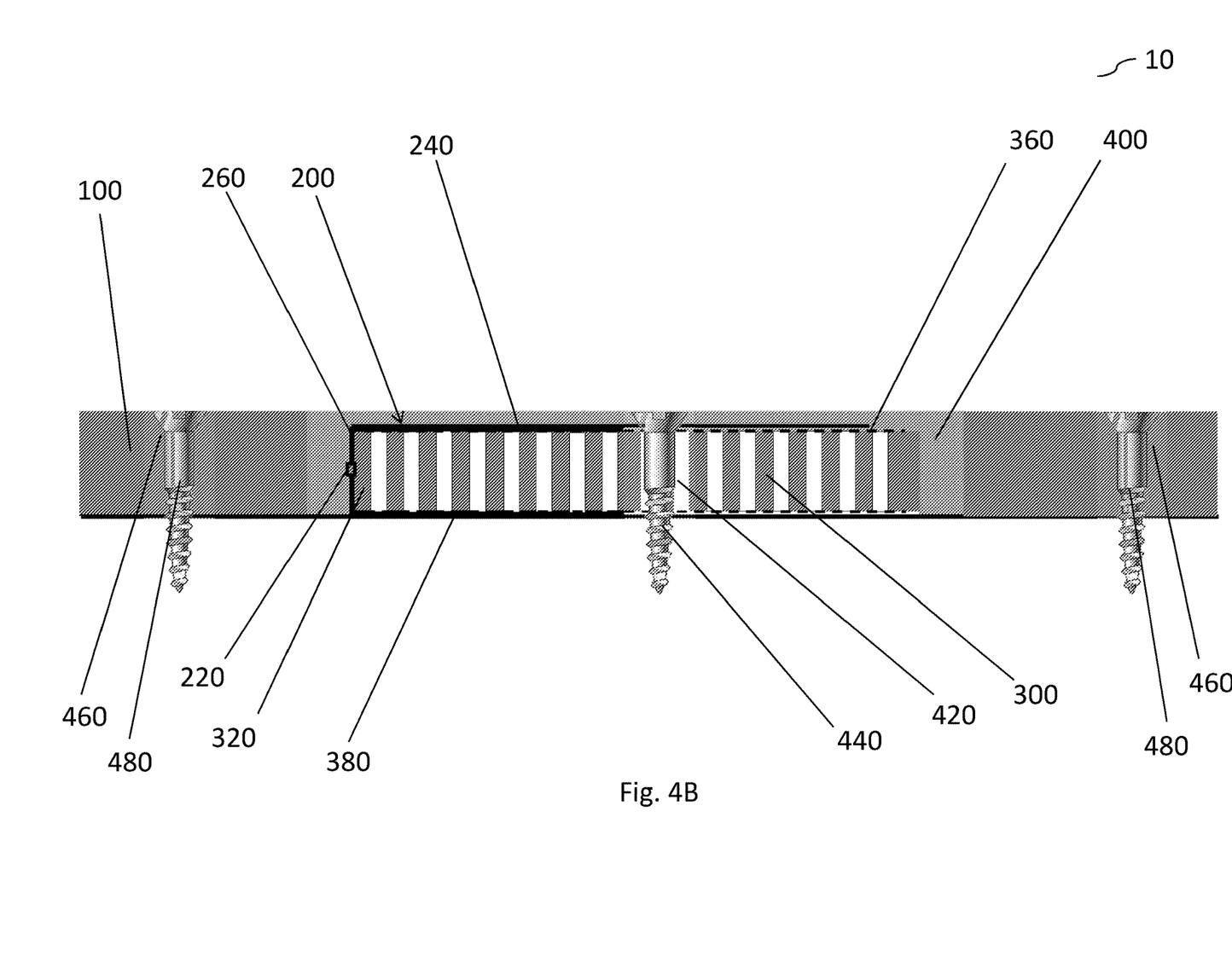
FIG. 4B shows a schematic cross-sectional view of a radio frequency communication guiding device in accordance with yet another embodiment of the present invention.

In one embodiment, there may be provided an additional metallic foil or plate 380 underneath the substrate layer 300, should the elongated body 100 is made from plastic, as shown in FIGS. 2B and 4B. This is advantageous to reduce the negative effect to the plastic body 100 caused by the uneven underlying floor, for example, when the underlying floor or the underground is made of different materials.

In yet another embodiment, the substrate layer 300 may include an anchor hole 420 arranged to receive an anchoring fastener 440, e.g. screw 440 to engage the radio frequency communication guiding device 10 to a surface underneath, such that the radio frequency communication guiding device 10 may be mounted on the ground and the tactile cover 400 may provide a tactile guide to visually impaired users to facilitate their navigation.

For instance, the radio frequency identification (RFID) circuit 200 may be preferably a passive RFID circuit 200 i.e. operating without any batteries. The passive RFID circuit 200 is preloaded with certain information e.g. location ID (the RFID unique ID) or navigational information. Preferably, the arrangement of the radio frequency communication guiding device 10 ensures the passive RFID circuit 200 to provide good radiation performance, in terms of the radiation pattern and the read range, such that the passive RFID circuit 200 may communicate with an external reader unit 500 (not shown) e.g. a visually impaired assistance tool 500 effectively. Optionally, the external reader unit 500 may be further connected to the backend server or connected via a smart device for accessing the database at the back end.

Advantageously, the visually impaired user may read the signals provided by the passive RFID circuit 200 through the external read unit 500. For instance, the signal may be delivered to the user through a voice message e.g. via an application in a smart device. Alternatively, the external read unit 500 may be provided in the form of a cane or as a navigational device.

Optionally, a pair of anchor holes 460 may be also provided at each of the two ends of the elongated body 100 for receiving an additional pair of anchoring fasteners 480, e.g. screws 480, thereby further securing the elongated body 100 to the ground.

It will be appreciated by persons skilled in the art that although the embodiments comprising the radio frequency communication guiding device 10 are related to providing navigational information, these embodiments may be applied in any other applications such as outdoor gaming, logistics, food and beverage ordering with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A radio frequency communication guiding device comprising:
   a generally elongated body having an elongated cavity therein arranged to house a communication circuit, wherein the communication circuit is supported by a substrate layer arranged to place within the cavity so as to support the communication circuit within the cavity and accommodate at least a portion of the communication circuit on one side of the substrate layer.

2. A radio frequency communication guiding device in accordance with claim 1, wherein the substrate layer supports the communication circuit such that the communication circuit is separated from the base of the cavity.

3. A radio frequency communication guiding device in accordance with claim 1, wherein the communication circuit includes a radio frequency communication chip arranged to be connected to an antenna for communicating with an external device.

4. A radio frequency communication guiding device in accordance with claim 3, wherein the radio frequency communication chip is connected to the antenna via an inlay.

5. A radio frequency communication guiding device in accordance with claim 3, wherein the antenna is planar and is placed in a planar position parallel to the substrate layer.

6. A radio frequency communication guiding device in accordance claim 1, wherein the substrate layer includes a chip cavity arranged for a radio frequency communication chip to be sandwiched within the substrate layer.

7. A radio frequency communication guiding device in accordance with claim 1, wherein the substrate layer is made of a non-conductive material.

8. A radio frequency communication guiding device in accordance with claim 7, wherein the substrate layer is made from foam, dielectric material or any combination thereof.

9. A radio frequency communication guiding device in accordance with claim 7, wherein the substrate layer is porous or includes numerous perforated apertures.

10. A radio frequency communication guiding device in accordance with claim 9, wherein any porous areas or perforated apertures of the substrate layer is covered by a layer of film.

11. A radio frequency communication guiding device in accordance with claim 1, wherein the elongated cavity is longer than the substrate layer.

12. A radio frequency communication guiding device in accordance with claim 11, wherein the elongated cavity and the substrate layer provides an elongated space for tuning of the communication circuit.

13. A radio frequency communication guiding device in accordance with claim 1, wherein the cavity is covered with a tactile cover after the communication circuit is placed within the cavity.

14. A radio frequency communication guiding device in accordance with claim 1, wherein the substrate layer may include an anchor hole arranged to receive an anchoring fastener to engage the device to a surface.

15. A radio frequency communication guiding device in accordance with claim 1, wherein the guiding device is arranged to provide a tactile guide to visually impaired users.

16. A radio frequency communication guiding device in accordance with claim 1, wherein the communication circuit is a radio frequency identification (RFID) circuit.

17. A radio frequency communication guiding device in accordance with claim 16, wherein the RFID circuit is a passive RFID circuit arranged to communicate with an external reader unit.

18. A radio frequency communication guiding device in accordance with claim 17, wherein the external reader unit is a visually impaired assistance tool.

19. A radio frequency communication guiding device in accordance with claim 1, wherein the elongated body is made with metal.

20. A radio frequency communication guiding device in accordance with claim 1, wherein the elongated body is made with plastic.

* * * * *